Patented June 18, 1940

2,204,616

UNITED STATES PATENT OFFICE 2,204,616

PROCESS FOR DEHYDRATION OF ACETIC ACID AND OTHER LOWER FATTY ACIDS

Donald F. Othmer, Brooklyn, N. Y., assignor to Tennessee Eastman Corporation, Kingsport, Tenn., a corporation of Virginia No Drawing. Application December 22, 1933, Serial No. 703,556

5 Claims. (Cl. 202—55)

This invention relates to a process for the concentration of aqueous solutions of acetic acid, the removal of the water therefrom, and the production thereby of substantially pure, "glacial" acetic acid.

Various solvent materials have been proposed for extracting acetic acid from its aqueous solutions by countercurrent liquid contact. The acetic acid after extraction may be more readily recovered from the solvent than from the water originally present. Still other methods have concerned themselves with the distillation of the aqueous solution in the presence of an auxiliary liquid, which, by reason of its insolubility in water and the vapor pressure relations dependent thereupon, brings over the water in a low boiling vaporous mixture, sometimes called an "azeotropic" mixture. In this process (see for example Othmer U. S. Patent No. 1,917,391), it is usual practice to condense the vaporous mixture of water and withdrawing agent, separate the two layers of water and water insoluble third liquid respectively, discharge the water layer to waste (or to an auxiliary still for removing the trace of third liquid dissolved therein), and return the third liquid or withdrawing agent to the head of the column as reflux wash for the purpose of bringing over more water in a continuous operation.

I have found that the so-called "mixed" ethers boiling within a range of about 80-105° C. are satisfactory materials to be used in either of these processes, or in the combined operation wherein, after systematic extraction of the aqueous acetic acid, the water dissolved with the acetic acid in the solvent layer is ejected in a so-called "azeotropic" distillation with the solvent itself. By "mixed," I refer to those ethers which are unsymmetrical in that there are different groups on the two sides of the oxygen atom. Thus, for example, ethyl-butyl ether may be regarded as the mixed ether formed by the combination of one molecule each of ethyl and butyl alcohols with the consequent loss of one molecule of water. The use of ethers of higher boiling point than 105° C., such as n-butyl ether or isobutyl ether (both of which are symmetrical) or of ethyl-amyl ether or propyl-butyl ether (both of which are unsymmetrical or "mixed"), is found to be disadvantageous because of the difficulty of separation of the ether itself from acetic acid.

The use of ethyl ether and isopropyl ether are old in the extraction process for acetic acid recovery. The use of either of these ethers in plant operations is accompanied by considerable losses due to the high rates of volatilization, and I have found that by the selection of a material from among the group of mixed ethers boiling between the range of 80-105° C., it is possible to almost entirely eliminate these losses. After the extraction operation is finished, the extracting solvent is found to contain, besides the acetic acid, an amount of water which is unavoidably dissolved. This amount of water will vary with each extracting material employed, and with the strength of acid in the original feed, and hence in the saturated solvent. I have found that, the amount of water dissolved by my preferred materials, is considerably less than the amount dissolved under the same conditions with either isopropyl ether or ethyl ether. This means that a drier acid is produced when the solvent is removed; or if anhydrous acid is desired in a second step, the cost of the second step will be reduced.

It is sometimes desirable to completely dehydrate the acid in a second step comprising the use of a so-called "azeotropic" distillation in which the extracting solvent itself is used as the withdrawing agent, for removing the water present at the completion of the extraction step. In this step, the condensate formed from the vapors passing over the head of the distilling column is separated into two layers comprising substantially pure water and substantially pure withdrawing agent respectively, and the former discharged to waste or to an auxiliary still for recovering the trace of withdrawing agent dissolved therein, while the latter is returned to the head of the still as reflux wash.

Ethyl ether does not have suitable properties to be useful as a withdrawing agent; and when isopropyl ether is so used, approximately 21 parts by weight of the ether must be distilled for every part of water removed. With ethyl-tertiary amyl ether (one of my preferred materials) on the contrary, only about five to six parts of ether must be distilled to remove one part of water. Since the latent heats of vaporization do not vary greatly for these ethers, it follows that the additional amount of heat required for removing the water when using ethyl-tertiary amyl ether, one of my preferred materials, is only about one-third as much as when using isopropyl ether. For the same reason, the capacity of the distilling column will be increased almost in inverse ratio because of the smaller amount of vapors to be handled per unit of water discharged.

I have found, however, that different of these ethers within this boiling range are preferable under different operating conditions such as, for example, the strength of dilute acid to be concentrated, the strength of final acid desired, and the ratio of ether to dilute feed which must be circulated in the extractor. The usual practice is to use as reflux to the distilling column part of the added material, which comes over the top in the azeotropic mixture while passing the balance to the extractor for extracting the acid from fresh feed and discharging the water to waste. Thus, for example, while using extractors and distilling columns within a practical size and efficiency for these respective operations, it may be found that a very large ratio of the total amount of ether coming over the head of the column in the azeotropic distillation must be cycled to the extractor, and too small an amount left to adequately perform the function of reflux wash in the distilling column. The conditions of operation are fixed due to the fact that a definite amount of water is brought into the distilling column with every unit of acid carried to the still from the extractor by the extracting fluid; and all of this water must be discharged over the head of the column (in the usual case where glacial acid is being produced) with an amount of the ether which bears an unvariable ratio to the amount of water.

Under these conditions, the demands for the third liquid by the extractor, and by the azeotropic distilling column per unit of water brought over the head of the distilling column (and hence per unit of acid concentrated) may exceed that which is available. I have found there are two methods of taking care of this difficulty, either refluxing a part of the water brought over the head of the distilling column while maintaining the amount drawn off constant, and thus obtaining an additional amount of the third liquid, or of choosing another third liquid having a greater ratio in the azeotropic mixture with water. This second method is much more economical of heat, because, once the water is brought over the head of the column, it should be discharged without refluxing it back for successive redistillation. It is always necessary in selecting the third liquid to discover a material which has the desired properties, and I have found that the group of mixed ethers boiling between 80 and 105° C. have the required properties and yet are sufficiently different in the azeotropic ratio to give considerable latitude in the choice for a particular set of operating conditions.

Among the mixed ethers which boil in the range of 80–105° C. and which may be used for this purpose, together with the approximate atmospheric boiling points in degrees centigrade are:

| | |
|---|---|
| Methyl n-amyl | 88.5 |
| Methyl iso-amyl | 91 |
| Methyl tert-amyl | 86.3 |
| Ethyl n-butyl | 91.4 |
| Ethyl iso-butyl | 80 |
| Ethyl tertiary amyl | 101 |
| Propyl iso-propyl | 80 |
| Propyl allyl | 92 |
| Iso propyl iso-butyl | 87 |
| Iso propyl allyl | 84.2 |

There are other mixed ethers boiling in the range 80–105° C. which may be used but which are not available in quantities for commercial utilization, and the above list is to be regarded merely as representative of the group as a whole.

My preferred materials have considerable merit over ethyl acetate, another material old in the art for use as an extracting and/or azeotropic withdrawing material. Not only is ethyl acetate much less efficient as an extracting liquid since it dissolves considerably more water under the same conditions than any of the mixed ethers; but it has a considerably lower power for withdrawing water in an azeotropic distillation than any of my preferred materials—although it is somewhat better than isopropyl ether in this regard. An additional disadvantage of ethyl acetate is its tendency to hydrolyze to give ethyl alcohol which, in the mixture with ethyl acetate, still further reduces the latter's efficiency—both as an extracting and as a withdrawing agent. The ethyl alcohol so formed may be lost in greater or less amount along with the waste water, and this loss may have an appreciable factor in the cost of operation. The mixed ethers boiling between 80 and 105° C. on the contrary, show no tendency to hydrolyze under the conditions to be met with in either extraction or distillation, and may be used indefinitely without any loss due to decomposition.

I have also found that the mixed ethers boiling in the range between 80 and 105° C. are useful for removing the water by extraction and/or azeotropic distillation from mixtures with other fatty acids such as formic, propionic and butyric or any mixture of two, three or four of these acids and water. In this regard, these ethers are particularly advantageous as compared to the esters, which have been widely used in the past, because of the tendency of esters to hydrolyze to give the constituent alcohol and acid. The alcohol may then recombine with another acid under the conditions of operation to give a new ester which will have entirely different extractive characteristics, and, especially, a different boiling point. The second ester formed during the continual operation of the process may gradually build up (at the expense of the first) to such an amount that the process as originally operated becomes inoperative. As mentioned above, my preferred materials are entirely stable under the conditions of operation, and may be used indefinitely with any mixture of these acids, without decomposition or change in properties in any way.

It will be understood by those skilled in the art that many arrangements of standard equipment may be used to carry out the features of my invention, and will be within the spirit of my disclosure as limited and defined by the appended claims.

In particular it may be noted that any standard type of extractor and/or distilling column or columns which are efficient for this purpose may be used, that the ether used may be either one substantially pure chemical compound or any mixture of those which are specified, that the dilute acid may be fed into the distilling column or columns either in a liquid or vaporous state, and the discharged acid may be either partly or completely dehydrated and passed from the distillation system in either a liquid or vaporous condition.

Having described my invention, what I claim and desire to secure by Letters Patent, is as follows:

1. A continuous extraction and distillation process for treating aqueous solutions containing at least one lower aliphatic acid to eliminate water and produce recovered aliphatic acid free from solvent, which comprises substantially continuously extracting said aqueous solution with an unsymmetrical ether solvent having a boiling point within the range of 80° C.–105° C. to form an extract essentially comprising ether, acid and some small amount of water present in the extract, substantially continuously feeding said ether-acid mixture in the vaporous condition to a distillation column, conducting azeotropic distillation in the distillation column wherein an ether-water azeotrope is removed from the upper portion of the column, condensing this azeotrope, separating the condensate into a solvent layer and a water layer, providing adequate reflux to the column during the azeotropic distillation by returning portions of both solvent and water layers to the column, and conducting a portion of the solvent to the extraction step for forming further extract feed.

2. A continuous extraction and distillation process for treating aqueous aliphatic acid solutions to eliminate water and produce a dehydrated acid that has no solvent mixed therewith, which comprises extracting said aqueous solution with a solvent of unsymmetrical ether having a boiling point within the range of 80° C.–105° C. to form an extract essentially comprising ether, acid and some water, recovering from the extract, by azeotropic distillation, the aliphatic acid component free from solvent, said distillation being characterized in that the azeotropic removal of water includes the use of another solvent having a greater ratio in an azeotropic mixture with water than the extracting agent, whereby a larger amount of solvent is distilled for each molecule of water removed in the azeotropic distillation, thereby furnishing adequate solvent for reflux, and returning at least a part of this latter solvent as adequate reflux for said distillation.

3. A continuous extraction and distillation process for treating aqueous aliphatic acid solutions to eliminate water and produce an acid free from solvent, which comprises substantially continuously extracting said aqueous solution with an unsymmetrical ether having a boiling point within the range of 80° C.–105° C. to form an extract essentially comprising ether, acid and some water, substantially continuously feeding the ether-acid mixture to a distillation column, conducting azeotropic distillation in the distillation column, wherein an ether-water azeotrope is removed from the upper portion of the column, condensing this azeotrope, providing adequate reflux to the column by returning portions of both ether and water to the column, and conducting a portion of the solvent to the extraction step for forming further extract feed.

4. In a continuous extraction and distillation process for treating aqueous solutions containing at least one lower aliphatic acid to eliminate water and produce a concentrated acid free from solvent, by substantially continuously extracting said aqueous solution with a solvent having a boiling point above 80° C. to form an extract which upon subsequent azeotropic distillation, would yield inadequate reflux, the steps which comprise conducting azeotropic distillation of said extract in a distillation column wherein a solvent-water azeotrope is removed from the upper portion of the column, condensing this azeotrope, providing adequate reflux to the column by returning portions of both solvent and water to the column, and conducting a portion of the solvent to the extraction step for forming further extract feed.

5. In a continuous extraction and distillation process for treating aqueous aliphatic acid solutions to eliminate water and produce a concentrated acid that has no solvent mixed therewith, by extracting said aqueous solution with an unsymmetrical ether having a boiling point above 100° C. to form an extract which upon subsequent azeotropic distillation would yield inadequate reflux, the steps which comprise subjecting said extract to a modified azeotropic distillation, said distillation being characterized in that the steps of forming the azeotrope include the use of another agent having a greater ratio in an azeotropic mixture with water than the ether employed in the extracting step, whereby a larger amount of liquid is distilled for each molecule of water removed in the azeotropic distillation, thereby furnishing adequate agent for reflux, and returning an adequate part of said latter agent as reflux for said distillation.

DONALD F. OTHMER.